(12) United States Patent
McKearney, Jr. et al.

(10) Patent No.: US 10,318,412 B1
(45) Date of Patent: Jun. 11, 2019

(54) SYSTEMS, METHODS, AND APPARATUS FOR DYNAMIC SOFTWARE GENERATION AND TESTING

(71) Applicant: The Travelers Indemnity Company, Hartford, CT (US)

(72) Inventors: Gary S. McKearney, Jr., Brooklyn, CT (US); Rakesh Narra, South Windsor, CT (US); Puneeth Lakshminarayanappa, Karnataka (IN); Rajdeep Si, Hartford, CT (US); David Lusignan, Woodstock, CT (US); Anuradha Gupta, Sitamarhi (IN)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 16/024,098

(22) Filed: Jun. 29, 2018

(51) Int. Cl.
| | |
|---|---|
| *G06F 11/36* | (2006.01) |
| *G06F 8/60* | (2018.01) |
| *G06F 8/10* | (2018.01) |
| *G06F 8/71* | (2018.01) |
| *G06F 8/30* | (2018.01) |

(52) U.S. Cl.
CPC ............ *G06F 11/3684* (2013.01); *G06F 8/10* (2013.01); *G06F 8/30* (2013.01); *G06F 8/60* (2013.01); *G06F 8/71* (2013.01); *G06F 11/3664* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 6,536,037 | B1* | 3/2003 | Guheen | G06F 8/71 |
| | | | | 703/2 |
| 6,986,134 | B1* | 1/2006 | Foster | G06F 8/61 |
| | | | | 717/177 |
| 8,434,053 | B2* | 4/2013 | Palmieri | G06F 8/61 |
| | | | | 717/101 |
| 8,505,005 | B1* | 8/2013 | Bos | G06F 8/61 |
| | | | | 717/177 |
| 8,943,470 | B2* | 1/2015 | Behr | G06F 8/10 |
| | | | | 717/110 |
| 8,997,091 | B1* | 3/2015 | Watson | G06F 8/60 |
| | | | | 717/175 |

(Continued)

FOREIGN PATENT DOCUMENTS

WO    WO-2018159997 A1 *  9/2018

OTHER PUBLICATIONS

Office Action for U.S. Appl. No. 15/472,825 dated Sep. 21, 2018; 16 pps.

(Continued)

*Primary Examiner* — Isaac T Tecklu
(74) *Attorney, Agent, or Firm* — Michael D. Downs; Fincham Downs LLC (57) ABSTRACT

Systems, apparatus, methods, and articles of manufacture provide for dynamic software generation and testing of software projects. In one example implementation, a controller device automatically defines a test case; generates an SQL definition for the automatically-defined test case, and executes the test case SQL definition to determine a test case SQL result of the test case SQL definition.

21 Claims, 4 Drawing Sheets

(56) References Cited

U.S. PATENT DOCUMENTS

| | | | | |
|---|---|---|---|---|
| 9,032,373 | B1* | 5/2015 | Gupta | G06F 11/3688 |
| | | | | 717/127 |
| 9,111,030 | B1* | 8/2015 | Dunn | G06F 16/248 |
| 9,208,062 | B1* | 12/2015 | Arguelles | G06F 11/3676 |
| 9,383,976 | B1* | 7/2016 | Singh | G06F 8/34 |
| 9,405,523 | B2* | 8/2016 | Choi | G06F 8/71 |
| 9,830,148 | B1* | 11/2017 | Mo | G06F 8/77 |
| 9,916,233 | B1* | 3/2018 | Qureshi | G06F 11/3692 |
| 2003/0037314 | A1* | 2/2003 | Apuzzo | G06F 11/3684 |
| | | | | 717/125 |
| 2003/0046681 | A1* | 3/2003 | Barturen | G06F 8/71 |
| | | | | 717/177 |
| 2003/0172368 | A1* | 9/2003 | Alumbaugh | G06F 8/71 |
| | | | | 717/106 |
| 2003/0192029 | A1* | 10/2003 | Hughes | G06F 8/20 |
| | | | | 717/101 |
| 2004/0068715 | A1* | 4/2004 | Wong | G06F 9/4862 |
| | | | | 717/136 |
| 2006/0277158 | A1* | 12/2006 | Kim | G06F 8/31 |
| 2007/0180490 | A1* | 8/2007 | Renzi | G06F 21/577 |
| | | | | 726/1 |
| 2007/0220479 | A1* | 9/2007 | Hughes | G06F 8/00 |
| | | | | 717/100 |
| 2007/0240102 | A1* | 10/2007 | Bello | G06F 8/36 |
| | | | | 717/104 |
| 2007/0288107 | A1* | 12/2007 | Fernandez-Ivern | G06Q 10/00 |
| | | | | 700/91 |
| 2008/0126880 | A1* | 5/2008 | Hegarty | G06F 11/3684 |
| | | | | 714/46 |
| 2008/0295085 | A1* | 11/2008 | Rachamadugu | G06F 8/75 |
| | | | | 717/159 |
| 2009/0070734 | A1* | 3/2009 | Dixon | G06F 8/71 |
| | | | | 717/102 |
| 2009/0138855 | A1* | 5/2009 | Huene | G06F 8/75 |
| | | | | 717/125 |
| 2010/0058294 | A1* | 3/2010 | Best | G06F 8/71 |
| | | | | 717/122 |
| 2010/0162217 | A1* | 6/2010 | Morrison | G06F 11/3604 |
| | | | | 717/129 |
| 2011/0191770 | A1* | 8/2011 | Inoue | G06F 9/445 |
| | | | | 717/178 |
| 2011/0209121 | A1* | 8/2011 | Nagata | G06F 11/3684 |
| | | | | 717/124 |
| 2011/0283270 | A1* | 11/2011 | Gass | G06F 8/65 |
| | | | | 717/168 |
| 2011/0296386 | A1* | 12/2011 | Woollen | G06F 8/70 |
| | | | | 717/124 |
| 2012/0131567 | A1* | 5/2012 | Barros | G06F 9/5088 |
| | | | | 717/170 |
| 2012/0246170 | A1* | 9/2012 | Iantorno | G06F 11/3672 |
| | | | | 707/748 |
| 2012/0297361 | A1* | 11/2012 | Dotan | G06F 8/71 |
| | | | | 717/110 |
| 2013/0174117 | A1* | 7/2013 | Watters | G06F 11/3664 |
| | | | | 717/106 |
| 2013/0174121 | A1* | 7/2013 | Pindrik | G06F 11/3612 |
| | | | | 717/120 |
| 2014/0181793 | A1* | 6/2014 | Kaliappan | G06F 11/3684 |
| | | | | 717/124 |
| 2014/0282433 | A1* | 9/2014 | Eilam | G06F 11/3688 |
| | | | | 717/131 |
| 2016/0004517 | A1* | 1/2016 | Safary | G06F 8/436 |
| | | | | 717/131 |
| 2016/0087854 | A1* | 3/2016 | Jayanti Venkata | G06F 8/60 |
| | | | | 709/224 |
| 2016/0210224 | A1* | 7/2016 | Cohen | G06F 9/44589 |
| 2016/0283360 | A1* | 9/2016 | Allen | G06F 16/3329 |
| 2016/0379281 | A1* | 12/2016 | Laxmanan | G06N 20/00 |
| | | | | 705/347 |
| 2017/0075790 | A1* | 3/2017 | Macleod | G06F 11/3664 |
| 2017/0123951 | A1* | 5/2017 | Abdirashid | G06F 11/263 |
| 2017/0147481 | A1* | 5/2017 | Doss | G06F 11/3684 |
| 2017/0220458 | A1* | 8/2017 | Finger | G06F 11/368 |
| 2017/0235553 | A1* | 8/2017 | Dow | G06F 8/43 |
| | | | | 717/140 |
| 2017/0351506 | A1* | 12/2017 | Celikyilmaz | G06F 8/65 |
| 2018/0032706 | A1* | 2/2018 | Fox | G06F 21/121 |
| 2018/0060460 | A1* | 3/2018 | Zhang | G06F 17/5009 |
| 2018/0095866 | A1* | 4/2018 | Narayanan | G06F 11/3684 |
| 2018/0150377 | A1* | 5/2018 | Oberle | G06F 11/3608 |
| 2018/0181483 | A1* | 6/2018 | Oberle | G06F 11/3688 |
| 2018/0182049 | A1* | 6/2018 | Oberle | G06Q 50/18 |
| 2018/0285099 | A1* | 10/2018 | Mandava | G06F 11/3668 |
| 2018/0285247 | A1* | 10/2018 | Gandhi | G06F 8/60 |

OTHER PUBLICATIONS

Bryant, "Stop Being Lazy, and Test Your Software (with the Help of Docker)", Nov. 2015, InfoQ.com, retrieved from: https://www.infoq.com/news/2015/11/testing-software-docker.

Farcic, "Continuous Deployment with Containers", Apr. 2016, InfoQ.com, retrieved from: https://www.infoq.com/articles/continuous-deployment-containers.

Ankerholz, "Testing the Right Things with Docker", Sep. 2016, Linux.com, retrieved from: https://www.linux.com/news/testing-right-things-docker.

Notice of Allowance for U.S. Appl. No. 15/472,719 dated Dec. 26, 2018; 19 pps.

Office Action for U.S. Appl. No. 15/472,719 dated May 24, 2018; 19 pps.

\* cited by examiner

SYSTEMS, METHODS, AND APPARATUS FOR DYNAMIC SOFTWARE GENERATION AND TESTING

FIELD OF THE INVENTION

The present invention relates generally to systems for maintaining applications and other software, and more particularly to improvements in computerized systems for software testing.

BACKGROUND OF THE INVENTION

Prior art systems are known for facilitating software development in enterprise environments. Such systems, however, are not optimized for the generation of test cases for a software project, for the generation of testing scripts suitable for testing a software project, or for the execution and evaluation of test cases across multiple data models that may be impacted by a software project. Prior art systems may be further limited to the availability of human teams, may require significant manual involvement at various points, and further may rely on multiple, independent testing modules that must be maintained separately. The technical drawbacks of these prior art systems lead to the creation of incorrect test cases, delays, slower development cycles, and inefficient use of computing resources.

SUMMARY OF THE INVENTION

According to some embodiments of the present invention, systems, methods, apparatus, articles of manufacture, and/or computer readable media (e.g., a non-transitory computer readable memory storing instructions for directing a processor of a software testing controller device) provide a process for automated generation and execution of test cases for a software project. In some embodiments, a process for testing software comprises the following steps:
   a) determine a test category associated with a software project;
   b) determine an attribute of a data model associated with the software project;
   c) automatically define a test case for the test category, wherein each test case comprises: a data table identifier that identifies a data table, and a test case expected result for the test case;
   d) generate a test case structured query language (SQL) definition for the test case based on the test category, the attribute, and the data table; and
   e) execute the test case SQL definition to determine a test case SQL result.

According to some embodiments, systems, methods, apparatus, articles of manufacture, and/or computer readable media may provide for a process further comprising one or more of:
   a) comparing the test case SQL result to the test case expected result;
   b) determining a test case status for the test case (e.g., based on the comparison);
   c) determining an execution status for the testing process (e.g., based on the test case status); and/or
   d) transmitting and/or storing an indication of the execution status (e.g., transmitting the execution status to at least one user).

According to some embodiments of the present invention, systems, methods, apparatus, articles of manufacture, and/or computer readable media (e.g., a non-transitory computer readable memory storing instructions for directing a processor of a software testing controller device) provide a process for automated generation and execution of SQL definitions for smoke tests and/or data validation tests.

According to some embodiments of the present invention, systems, methods, apparatus, articles of manufacture, and/or computer readable media (e.g., a non-transitory computer readable memory storing instructions for directing a processor of a software testing controller device) provide a process for automated generation and execution of test cases for a software project (e.g., executing at least one test case structured query language (SQL) definition). In some embodiments, a process for testing software comprises the following steps:
   a) retrieving a stored timing requirement for executing a testing process for a software project;
   b) retrieving a stored release version requirement for executing the testing process for the software project;
   c) based on the timing requirement and the release version requirement, identifying, and retrieving stored parameters for the testing process for the software project, the stored parameters comprising:
      a. a software release version,
      b. a data model having at least one attribute,
      c. at least one attribute identifier that identifies an attribute of the data model to be impacted by the software project,
      d. a data table identifier that identifiers a data table, and
      e. a plurality of test category statuses, each corresponding to a respective test category;
   d) for each test category status of the plurality of test category statuses that indicates a corresponding test category is required for the testing process, automatically defining, and storing at least one respective test case for the corresponding test category, wherein each test case comprises:
      a. a test case identifier that identifies the respective test case,
      b. the data table identifier,
      c. an indication of the corresponding test category, and
      d. a test case expected result for the test case;
   e) retrieving a first predetermined SQL format for a first automatically-defined test case, based on the test category associated with the first automatically-defined test case;
   f) generating a first test case SQL definition for the first automatically-defined test case based on the first predetermined SQL format, the data table identifier, and the at least one attribute identifier;
   g) executing the first test case SQL definition to determine a first test case SQL result of the first test case SQL definition for the first automatically-defined test case;
   h) comparing the first test case SQL result to the test case expected result that is associated with the first automatically-defined test case, to determine a first test case status for the first automatically-defined test case;
   i) based on at least the first test case status, determining an execution status for the testing process; and
   j) transmitting an indication of the execution status for the testing process.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

As will be understood by those skilled in the art, a software testing process may include one or more tests of software code for an application or other software project. For instance, a software application may be developed (e.g., in a software development environment) and then tested in one or more software testing environments.

According to some embodiments of the present invention, a software testing process addresses technical issues associated with development and/or maintenance of software applications. The inventors have recognized that distributed development and maintenance of a plurality of applications and other types of software projects provide unique challenges during the testing of software. There is a need for software testing processes that accelerate the rate of software testing by using automatically generated and/or automatically executed test cases.

In accordance with one or more embodiments described in this disclosure, some or all steps of a software development life cycle may be improved, and technical weaknesses overcome, using specific configurations of features and/or hardware to provide for automatic generation and/or execution of test cases to test a software project.

In accordance with some embodiments, in addition to the technical improvements described in this disclosure, the software development architecture and/or software certification process may allow for efficient scaling by reducing the requirement for human interaction. Software development professionals (e.g., software developers and quality assurance (QA) team members) can validate software with little or no dependency on other personnel, manual methods, or manual processes. As a result, steps in prior art systems that cause delays and idle time (e.g., through manually developing, tracking, and executing test cases) may be avoided.

It will be understood by those skilled in the art that a software development life cycle may include a number of different stages, including build, analysis, testing, and deployment. According to some embodiments, software development in a build phase may include the use of tools, such as build automation tools (e.g., Maven™) for pulling in required computer resources and source code management tools and version control repositories (e.g., Github™). Build automation is the process of automating the creation of a software build and the associated processes including compiling computer source code into binary software and packaging binary software. Version control (also known as revision control or source control) is a component of software configuration management, and refers to the management of changes to documents, computer programs, large web sites, and other collections of information.

Software analysis may include, for example, software analysis tools such as a unit-testing framework for the Java™ programming language (e.g., JUnit), acceptance testing tools such as Cucumber, static Java-based source code analyzers (e.g., PMD), and Java software coverage analysis tools (e.g., Cobertura, Clover™). "Unit testing," as the term is used in this disclosure, refers to a testing method for testing individual units of source code. The scope of the individual unit may vary from coding project to coding project, but in general the unit will be the smallest testable portion of a given application or other software project. For example, in one case the smallest testable portion may be a specific function or called procedure. In other circumstances, the testable unit may be an interface, a specific object, or a specific class. "Static analysis," also called "static software analysis," is a method of computer program debugging that is done by examination of the software without executing the program. The process provides an understanding of the software structure and can help to ensure that the software adheres to industry standards.

Testing tools that may be useful, in accordance with some embodiments, for testing software for production may include tools for smoke testing (e.g., SOAP UI), a software-testing framework for web applications (e.g., Selenium™) for regression testing, and load-testing and/or performance-testing tools, such as Apache JMeter™ by Apache Software Foundation. Regression testing is the process of testing changes to computer programs to make sure that the older programming still works with the new changes. Regression testing, particularly in larger companies, is typically performed by software testing specialists. Acceptance testing is a level of the software testing where a system is tested for acceptability. The purpose of acceptance testing is to evaluate a system's compliance with the business requirements and assess whether it is acceptable for delivery. Performance testing, in general, is a testing practice performed to determine how a system performs in terms of responsiveness and stability under a particular workload. It can also serve to investigate, measure, validate, or verify other quality attributes of the system, such as scalability, reliability, and resource usage.

According to some embodiments, a software testing control application for controlling end-to-end software development is sequenced programmatically and interfaces with one or more repositories (in one or more database environments) for storing a plurality of test cases (e.g., Quality Center™ by Micro Focus), one or more repositories storing test execution results, one or more repositories for storing and managing operation data about data systems and applications (e.g., Enterprise Meta>Environment™ by Ab Initio), one or more application content databases (e.g., Teradata Database™ by Teradata Corporation, SharePoint™ by Microsoft Corporation), and one or more application project management databases (e.g., Project and Portfolio Management™ (PPM) by Hewlett Packard Enterprise (HPE)). In some embodiments, the software testing control application may be implemented using any programming language and/or platform suitable for the intended use, including but not limited to the Java programming language and the Visual Basic for Applications (VBA) programming language developed by Microsoft Corporation and available its Microsoft Office™ applications such as Word™ and Excel™.

The following example scenario describes one example implementation of a software testing control application for controlling end-to-end a software development life cycle in accordance with one or more embodiments of the present invention. Although the example scenario describes the building, testing, and deployment of a web application programmed using the Java programming language, the example scenario is not intended to be limited to any embodiment of the present invention. The scenario may be modified to accommodate any of various types of programming languages and development tools that may be useful in providing for testing of software for a software project using automatically generated and automatically executed test cases.

According to the example scenario, a developer develops a Java application as a software project (e.g., using an integrated development environment (IDE)). To provide for version control, the developer checks-in the software changes to a source code repository (e.g., a Github source repository).

The software testing control application allows the developer (or other user) the option to schedule the time of execution of the software testing control application to test the software project. The software testing control application is triggered to test the software project at the time scheduled by the user.

The software testing control application retrieves information related to the software project from a data repository (e.g., a SharePoint™ database). The information may be stored, for example, in a plurality of records for the software project. According to the example scenario, the software testing control application retrieves information related to one or more data tables impacted by the software project. In one example, the information on impacted data tables is stored in and retrieved from a data table (e.g., a server-based database, a spreadsheet accessible via SharePoint™). In some embodiments a user inputs the information on impacted data tables in a format configured for retrieval and access by the software testing control application.

According to the example scenario, the software testing control application retrieves information defining functional requirements for the software project. Similar to the information about the impacted data tables, the information about the functional requirements may be stored in and retrieved from a data table (which may be the same or different from the data table storing the information about impacted data tables). In some embodiments a user inputs the information on functional requirements in a format configured for retrieval and access by the software testing control application.

Continuing with the example scenario, the software testing control application creates all requirements for all smoke tests for all impacted tables. The software testing control application further creates requirements for data validation based on the functional requirements information. The software testing control application may upload all generated requirements to a data repository for a quality assurance management platform (e.g., Quality Center).

Next, the software testing control application automatically creates smoke test cases for impacted data tables and/or data validation test cases for impacted attributes, fields, and/or data tables (e.g., based on a predefined SQL format). The software testing control application may upload all generated test cases to the data repository for the quality assurance management platform. The software testing control application then maps all generated test cases to the corresponding smoke test requirements and/or data validation requirements (test case-to-requirements mapping).

The software testing control application further creates smoke test SQL definitions for each smoke test, executes the smoke test SQL for all the impacted tables, and records the results of execution of the smoke test SQL definitions. Similarly, the software testing control application determines and executes SQL definitions (created automatically and/or predefined and stored) for each data validation test case, executes the data validation test SQL definitions, and records the results.

After executing the SQL definitions for the test cases, the software testing control application creates and/or updates a respective status for each executed test case based on the execution results (e.g., passed, failed, not completed, etc.). The respective statuses may be stored, for example in a data table designated for tracking test case results. In some embodiments, the software testing control application may store one or more of the test case SQL definitions in association with the software project and/or in association with the respective text case for which the SQL definition was executed.

Finally, according to the example scenario, an execution log is updated for the software project, and a report is generated and transmitted to the developer for the software project.

The following example scenario describes another example implementation of a software testing control application for controlling, end to end, a software development life cycle in accordance with one or more embodiments of the present invention. Although this second example scenario describes the building, testing, and deployment of a web application programmed using the Java programming language, the example scenario is not intended to be limited to any embodiment of the present invention. This scenario may be modified to accommodate any of various types of programming languages and development tools that may be useful in providing for testing of software for a software project using automatically generated and automatically executed test cases.

According to this scenario, a user interface for scheduling an automated software testing is presented to a user. In one example, a user is able through the user interface, to input an indication of a time at which automated testing will be initiated by a software testing controller device of a software code development system. For example, the user interface may allow a user to input one or more of a number of days, hours, minutes, and/or seconds the system should wait (e.g., a delay time) before initiating the testing process. In another example, the user interface may allow a user to input a specific time at which to start a testing process.

The user interface may further comprise an indication of a software release version identifier that identifies a release version associated with the software project. The software release version identifier may be used, in some embodiments, to identify requirements associated with the software project to facilitate the software testing process. The software testing control application stores the information received through the user interface.

The software testing control application is configured with computer-readable software instructions to determine when to initiate the software testing process based on the stored timing information. At the predetermined time, the software testing control application triggers the start of the software testing process. The software testing process accesses stored software project parameters associated with the software project based on the software release version identifier and/or a software project identifier that identifies the software project.

In one example, the software project parameters comprise an indication of a test design status. If the test design status associated with the software project indicates the software project needs to be tested, the software testing control application retrieves from information associated with the software project an indication of at least one data table impacted by the software project, and all the attribute names for the impacted data tables (e.g., for use in test SQL creation).

According to this second example scenario, the software testing process also includes one or more validation steps to ensure the testing environment is set up properly to generate and execute test cases. In one example, the software testing control application may count a number of stored functional requirements to be tested (e.g., after accessing the functional requirements based on the software project identifier and/or the software release version identifier), and compare a number of available records, folders, and/or other addressable logical locations for storing SQL definitions and/or storing testing execution results. If the numbers do not match, the software testing process may terminate.

Once any validations are completed successfully, the software testing process continues with creating requirements. For example, the software testing process checks the stored smoke test status provided by a user for one or more of the following test categories:
1. change data capture (CDC);
2. primary key check (PKC);
3. duplicate check;
4. data table completeness check (TCL);
5. data move tests (e.g., straight moves and/or more complex moves involving data derivation based on multiple data sources).

For example, if a stored smoke test status for a particular test category indicates that a test of that test category is to be performed, the software testing process creates a respective requirement for that test category.

In one example, each created requirement may be defined by respective information (e.g., and stored in a data repository), including one or more of: a requirement identifier that uniquely identifies the requirement, a description that describes the requirement, a software project identifier that identifies the software project, a release version identifier, a creation date, a priority of the requirement, and/or a requirement type. According to this second example scenario, the software testing process compares any newly-created requirement with a corresponding previously-created requirement and replaces and/or updates the previously-created requirement if the two requirements are different. In one example, the created requirements are uploaded to a quality control system for test case management.

After creating and/or updating the requirements, the software testing process automatically defines test cases for smoke tests and data validation tests. For the smoke tests, the impacted data table names are accessed and for each impacted data table, a respective test case is created for each test category identified for smoke testing. Data validation test cases are created for each required data validation test. In one example, test case definitions are stored in one or more data tables (e.g., as individual test case records). Definitions may include, for example, an application identifier, a test category, data table identifiers, test case descriptions, priority information, an indication of expected results, test execution status, and/or an SQL file name associated with the test case.

According to the second example scenario, after creating the test case definitions, the software testing process maps each defined test case to a stored requirement of the testing process in a software quality/defect management system (e.g., Quality Center system). The software testing process may upload each test case to a test plan section of the software quality management system and/or create a test set of the defined test cases in the software quality management system. In one example, the software testing control application transmits a signal to the software quality management system to pull all of the test cases created for a test plan to a test set for execution.

Once the test setup is completed, the software testing process then proceeds with test execution. Test execution of a test case may comprise one or more of the following steps:
1. Access test case definition (e.g., from database of stored test cases);
2. Retrieve user-provided test SQL (if available);
3. Create test SQL definition;
4. Modify test SQL definition;
5. Execute test SQL definition;
6. Update test case status;
7. Store test case result in defect management system;
8. Generate report of test execution; and
9. Update test design status.

To create test SQL definitions, the software testing control application first checks the smoke test case category status provided by user at the time of request creation (e.g., stored in a data repository). If the smoke test status for the testing process indicates smoke tests are to be executed, then the software testing control application checks for the list of impacted attributes for the particular release version identified in the request. The software testing control application reads the requirements information and stores the respective table names having impacted attributes. The software testing control application downloads the data model associated with the software project, and queries for the impacted data table name in the data model.

For PKC smoke tests, for each impacted data table the software testing process extracts the primary key attributes from the associated data model. The software testing process takes the database name indicated by a user at the time of request creation and uses this database name for SQL creation. The software testing control application uses the extracted attributes and the database name to check that there is no more than one primary key present in the data table. The software testing process may access a predefined SQL format to create the test case SQL definition for the PKC smoke test.

For any duplicate check test cases, the software testing control application extracts all the attributes present in the associated data model. The software testing process takes the database name indicated by a user at the time of request creation and uses this database name for SQL creation. The software testing control application uses the extracted attributes and the database name to check that there is no more than one primary key present in the data table. The software testing process may access a predefined SQL format to create the test case SQL definition for the duplicate check test.

For any duplicate check test cases, the software testing control application extracts all the attributes present in the associated data model. The software testing process takes the database name indicated by a user at the time of request creation and uses this database name for SQL creation. The software testing process may access a predefined SQL format to create the test case SQL definition for the duplicate check test.

For any TCL test cases, the software testing control application takes the data table name(s) for any impacted attributes and the database name indicated by a user at the time of request creation. The software testing control application uses data table name(s) and the database name for SQL creation. The software testing process may access a predefined SQL format to create the test case SQL definition for the TCL test.

For any CDC test cases, the software testing control application extracts all the attributes present in the associated data model. The software testing process takes the database name indicated by a user at the time of request creation and uses this database name for SQL creation. The software testing control application uses the extracted attributes and the database name to check that there is no record getting expired without any change in the value. The software testing process may access a predefined SQL format to create the test case SQL definition for the CDC test.

For any date alignment test cases, the software testing control application extracts all the attributes present in the associated data model. The software testing process takes the database name indicated by a user at the time of request creation and uses this database name for SQL creation. The software testing process may access a predefined SQL format to create the test case SQL definition for the date alignment test.

After creating all the test case SQL definitions, the software testing control application continues the software testing process by executing all test case SQL definitions, storing the test case SQL results, and updating test case status for each test case by comparing the test case SQL results with test case expected results.

Finally, according to this second example scenario, the software testing control application transmits to the user who set up the testing process request a report notifying the user that the testing process has executed. The report preferably includes an indication of how many test cases passed, failed, and/or did not complete. The software testing control application may update the test design status indicator for the software project to indicate that testing of that release version of the software project is completed.

Various embodiments described in this disclosure provide for one or more types of improvements to the systems conventionally used in the software arts for managing the maintenance and development of software products, such as applications and other coding projects. Some embodiments advantageously eliminate wait times, migration delays, and interruptions, with low or no human intervention. One or more embodiments provide advantageously for an increased number of test cases that may be executed in a testing environment as a result of time saved in creating and testing test cases in the testing environment. Some embodiments provide advantageously for the elimination of duplicate software packaging and technical repository creation, reducing resource allocation costs and redundant process steps.

Figure 1:
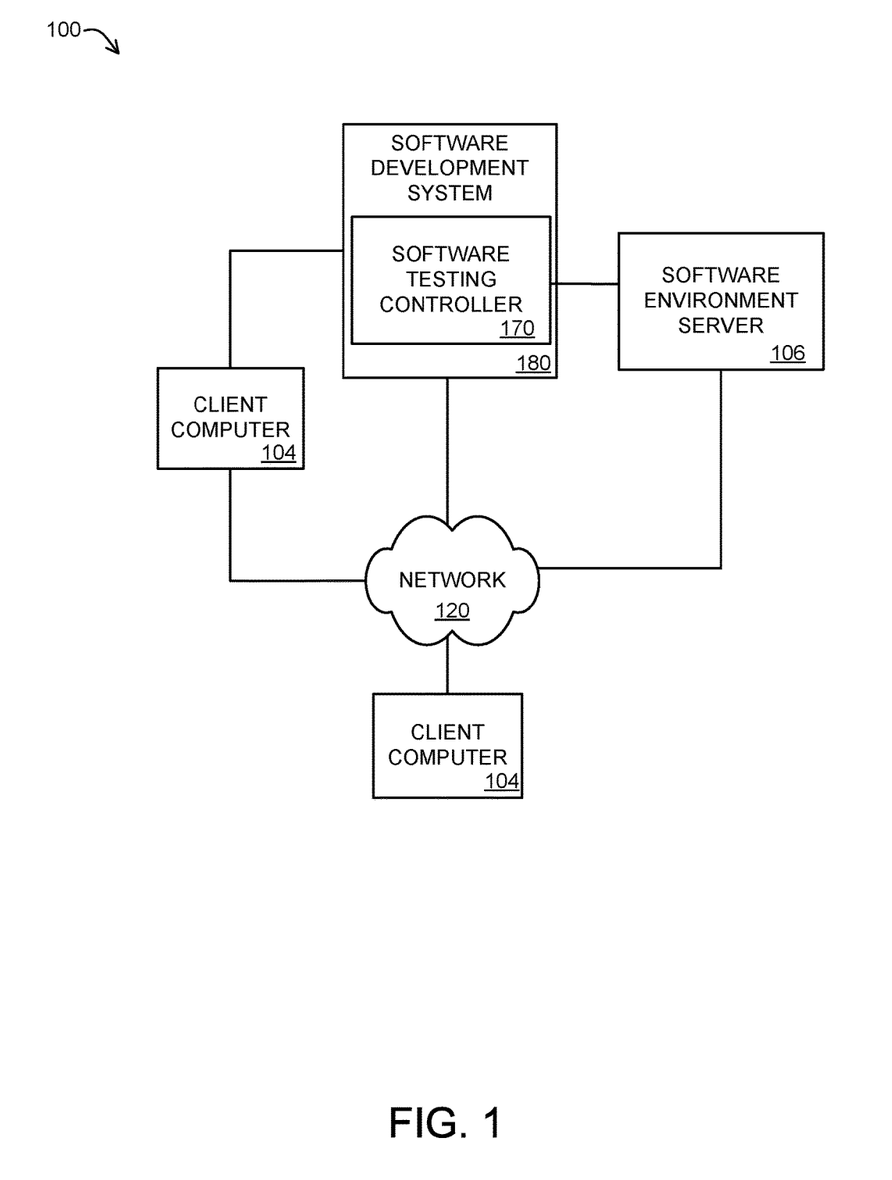
FIG. 1 is a block diagram of a system according to one or more embodiments.

FIG. 1 depicts a block diagram of an example system 100 for software development, according to some embodiments. Although reference may be made in this disclosure to examples of web applications and/or enterprise applications, it will be readily understood that disclosed embodiments may be useful with respect to various types of applications.

The system 100 may comprise one or more client computers 104 in communication with a software development system 180 via a network 120. A software testing controller 170 is integrated into the software development system 180, for example, as an embedded module, a portal, or other functionality accessible through and/or by the software development system 180. In one embodiment, information stored by the software development system 180 may be provided advantageously to the software testing controller 170 for software testing processing. For example, stored information about an application in development (e.g., source code, current status, eligibility for automated software testing) may be provided to or otherwise accessible by the software testing controller 170 without requiring manual input (e.g., from a user).

In some embodiments, the software development system 180 may be hosted by a controller or server computer (e.g., a computer specially programmed to provide for one or more of the functions described in this disclosure). Typically, a processor (e.g., one or more microprocessors, one or more microcontrollers, one or more digital signal processors) of a client computer 104 or a server computer will receive instructions (e.g., from a memory device or like device), and execute those instructions, thereby performing one or more processes defined by those instructions. Instructions may be embodied in, for example, one or more computer programs and/or one or more scripts.

In some embodiments the software development system 180 and/or one or more of the client computers 104 stores and/or has access to data useful for facilitating software development workflows. According to some embodiments, any or all of such data may be stored by or provided via one or more software environment servers 106 of system 100. A software environment server 106 may comprise, for example, an external computing system, a virtual computing environment, or a remote computer system for storing and serving data, such as test scheme data (e.g., for use in conducting one or more testing scenarios), or a combination of such remote and local data devices.

In some embodiments, the software development system 180 may store some or all of the program instructions, and a client computer 104, such as a computer workstation or terminal of a user (e.g., a software developer or quality assurance (QA) professional), may execute the application remotely via the network 120, and/or download from the software development system 180 (e.g., a web server) some or all of the program software for executing one or more of the various functions described in this disclosure. In some embodiments, a client computer 104 is used to execute an application, stored locally on the client computer 104, that accesses information stored on, or provided via, the software development system 180, software environment server 106, one or more other client computers 104, and/or network 120.

In one embodiment, a server computer may not be necessary or desirable. For example, some embodiments described in this disclosure may be practiced on one or more devices without a central authority. In such an embodiment, any functions described in this disclosure as performed by a server computer and/or data described as stored on a server computer may instead be performed by or stored on one or more such devices. Additional ways of distributing information and program instructions among one or more client computers 104 and/or server computers will be readily understood by one skilled in the art upon contemplation of the present disclosure.

Figure 2:
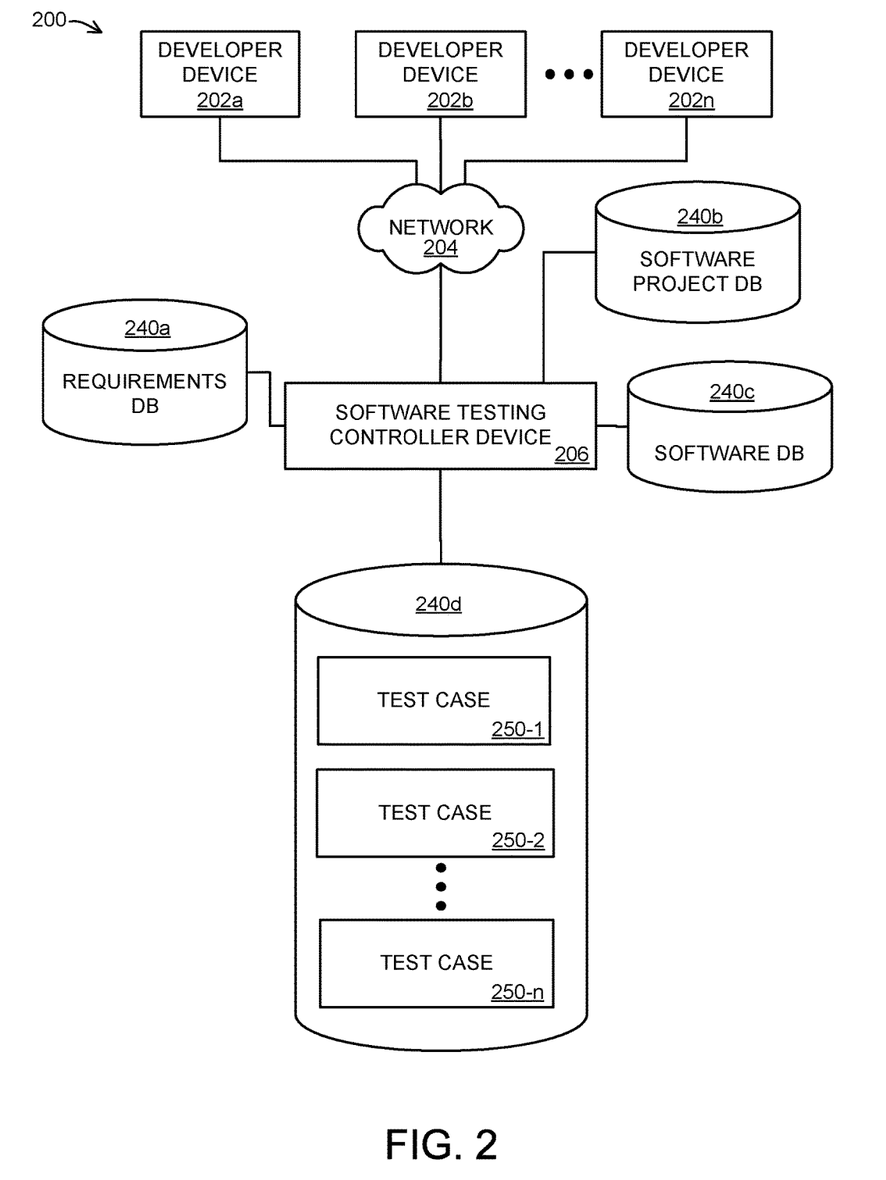
FIG. 2 is a block diagram of a system according to one or more embodiments.

Referring now to FIG. 2, a block diagram of a system 200 according to some embodiments is shown. In some embodiments, the system 200 may comprise a software development platform. In some embodiments, the system 200 may comprise a plurality of developer devices 202*a-n*, networks 204, and/or a software testing controller device 206.

In accordance with some embodiments, the system 200 may comprise one or more databases. The example system 200 comprises a requirements database 240*a*, a software project database 240*b*, a software database 240*c*, and/or a test case database 240*d*. As depicted in FIG. 2, any or all of the various components 202*a-n*, 204, and 206 may be in communication with and/or coupled to one or more databases 240*a-d*.

According to some embodiments, any or all of the components 202*a-n*, 204, 206, and 240*a-d* of the system 200 may be similar in configuration and/or functionality to any similarly named and/or numbered components described in this disclosure. Fewer or more components 202*a-n*, 204, 206, and 240*a-d* (and/or portions thereof) and/or various configurations of the components 202*a-n*, 204, 206, and 240*a-d* may be included in the system 200 without deviating from the scope of embodiments described in this disclosure. While multiple instances of some components are depicted, and while single instances of other components are depicted, for example, any component 202*a-n*, 204, 206, and 240*a-d* depicted in the system 200 may comprise a single device, a combination of devices, and/or components 202*a-n*, 204, 206, and 240*a-d*, and/or a plurality of devices, as is or becomes desirable and/or practicable. Similarly, in some embodiments, one or more of the various components 202*a-n*, 204, 206, and 240*a-d* may not be needed and/or desired in the system 200.

According to some embodiments, the developer devices 202*a-n* may be utilized by software development professionals to access (e.g., via the network 204 and/or one or more other networks not explicitly shown) functionality provided by software testing controller device 206, various types of data provided by databases 240*a-d*, and/or test cases 250-1-*n*.

In some embodiments, more than one test case 250-1-*n* may be implemented for the same purpose (e.g., two test cases for regression testing) and/or for more than one purpose (e.g., for smoke testing, data validation testing, and regression testing).

According to some embodiments, communications between the developer devices 202*a-n* and the test cases 250-1-*n*, and/or the databases 240*a-d* may be managed and/or facilitated by the software testing controller device 206. The software testing controller device 206 may, for example, receive commands and other types of communications from developer devices 202*a-n* (e.g., a request to schedule a software testing process) and, in response, initiate a software testing process with an automated software testing feature using automatically-defined test cases.

In one example, a requirements database 240*a* comprises requirements information (e.g., functional requirements, data validation requirements, and the like) related to one or more software projects. In some embodiments, the requirements database 240*a* may comprise one or more SQL templates for use in creating test case SQL definitions automatically during a software testing process. In accordance with some embodiments, requirements information may be accessed by the software testing controller device 206 for testing software during a software testing process.

In some embodiments, the software testing controller device 206 may be in communication with the software database 240*c*. According to some embodiments, the software database 240*c* may comprise a dynamically-scalable database service (e.g., the DynamoDB™ service provided by Amazon® Web Services, LLC). Some embodiments provide for receiving and/or storing source code (e.g., by a software testing controller device 206) and/or packaging source code for migration from one environment to another and storing the software package in a repository. In some embodiments, the software testing controller device 206 may be in communication with the software database 240*c* for receiving and/or storing source code and/or software packages associated with a software project to be tested.

In some embodiments, the software testing controller device 206 may be in communication with the software project database 240*b*. According to some embodiments, the software project database 240*b* may comprise a dynamically-scalable database service. The software project database 240*b* may, for example, store information specific to the status of a software project with respect to a software testing process. For example, one or more records may be stored in the software project database 240*b* in association with a particular application or other software project, with each record providing information about the past and/or current status with respect to automated software testing (e.g., smoke testing and data validation testing executed suing automatically-defined test cases). During a software testing process (as described with respect to various embodiments in this disclosure) executed by the software testing controller device 206, the software testing controller device 206 may store information about successes and/or failures in the execution of one or more test cases (e.g., in a variety of test case categories), including test cases defined automatically by the software testing process. The software testing controller device 206 may further use stored information about software project statuses to coordinate report generation and/or assignment and/or notification of developers to resolve any issues identified during software testing.

In one embodiment, software project database 240*b* includes one or more database records, each record corresponding to a software project in a software development life cycle. In one example embodiment, each record of the software project database 240*b* is associated with a respective software project and includes one or more of: a unique identifier that identifies a software project; an indication of a software release version for the software project; a data model associated with the software project; at least one attribute identifier that identifies an attribute of the data model to be impacted by the software project; at least one data table identifier, each data table identifier identifying a respective data table; one or more test category statuses, each test category status corresponding to a respective test category; and a software project status (e.g., indicating an overall status of the software project, whether it is ready for software testing, etc.).

As discussed in this disclosure, some embodiments provide for testing software associated with a software project (e.g., automatically under the control of the software testing controller device 206) and creating test cases and test case SQL definitions automatically. In some embodiments, the software testing controller device 206 may be in communication with the test case database 240*d*. According to some embodiments, the test case database 240*d* may comprise a dynamically-scalable database service. The test case database 240*d* may, for example, comprise a data store of data suitable for testing and/or debugging a software project.

In one or more embodiments, the test case database 240*d* may be used for storing information related to one or more test cases 250-1-*n* for testing a software project. In one embodiment the test case database 240*d* comprises information defining test cases to be executed during a software testing process by the software testing controller device 206. In one or more embodiments, the test case database 240*d* may comprise test case SQL definitions associated with various test cases to be executed during a software testing process.

According to some embodiments, each test case of the test cases 250-1-*n* may comprise information defining a corresponding test case, the information including one or more of: a test case identifier that uniquely identifies the test case; a data table identifier that identifies a data table (e.g., a data table identifier in requirements information associated with a software project); an indication of a test category; a test case expected result for the test case; and/or a test case SQL definition for the test case. According to some embodiments, the test case information defining test cases 250-1-n may be determined, replaced, and/or modified automatically during a software testing process.

According to some embodiments, any or all of the developer devices 202a-n in conjunction with one or more of the databases 240a-d (e.g., via the network 204) may conduct (in whole or in part), facilitate, and/or otherwise be associated with execution of one or more stored procedures, applications, processes, and/or methods (and/or one or more portions and/or combinations thereof) to derive and/or execute the test cases 210a-n, as described in this disclosure.

According to some embodiments, processes described in this disclosure may be performed and/or implemented by and/or otherwise associated with one or more specialized and/or computerized processing devices, specialized computers, computer terminals, computer servers, computer systems and/or networks, and/or any combinations thereof (e.g., by one or more application developers and/or developer devices).

Any processes described in this disclosure do not necessarily imply a fixed order to any depicted actions, steps, and/or procedures. Embodiments may generally be performed in any order that is practicable, unless otherwise and specifically noted.

Figure 3:
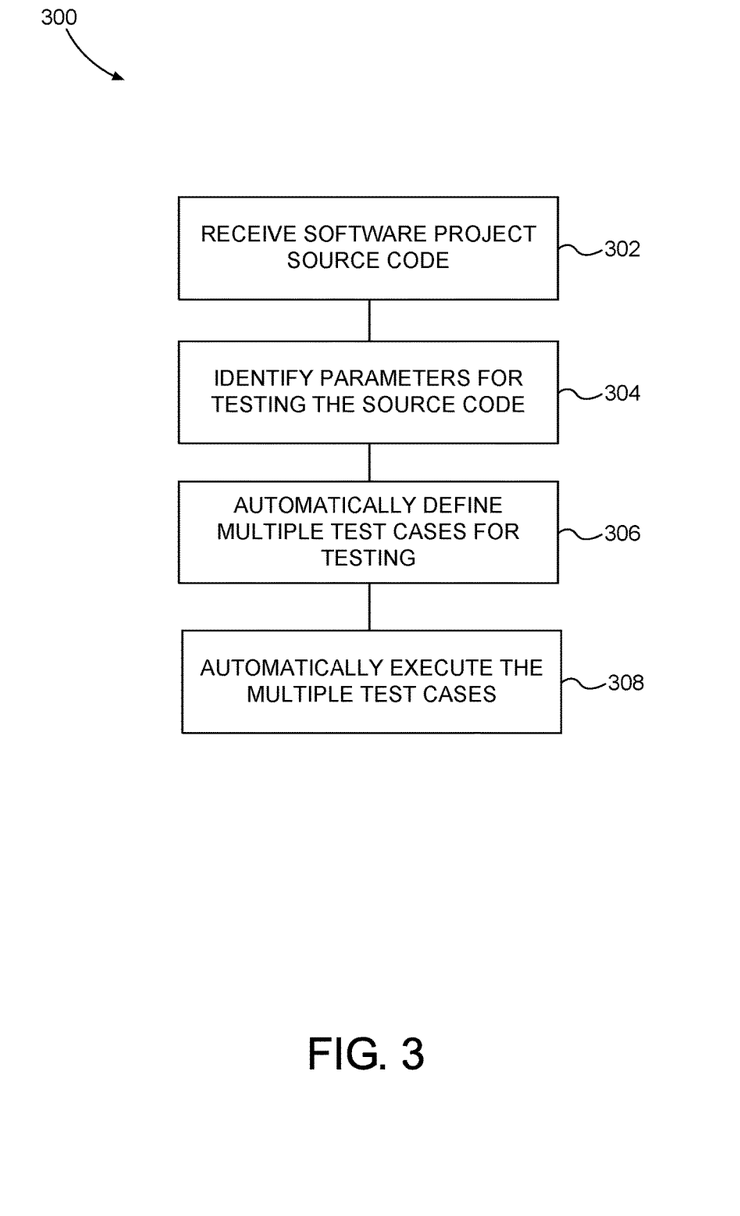
FIG. 3 is a flowchart of a method according to one or more embodiments.

Referring now to FIG. 3, a flow diagram of a method 300 according to some embodiments is shown. The method 300 may be performed, for example, by a software testing controller device (e.g., of a software development system). According to some embodiments, the method 300 may comprise receiving software project source code (e.g., source code for a web-based application), at 302. The method 300 may further comprise identifying parameters for testing the source code, at 304. In one embodiment, in response to the triggering of the software testing process (e.g., based on a predetermined start time), identifying the parameters comprises accessing stored software project information (e.g., in software project database 240b) and/or requirements information associated with the software project (e.g., in requirements database 240a).

In some embodiments, the process may further comprise retrieving a stored timing requirement for executing a testing process, comparing the stored timing requirement to a current time, and initiating a software testing process based on the comparison of the current time and the stored timing requirement.

In one or more embodiments, identifying parameters for testing the source code may comprise retrieving a stored release version requirement for executing the testing process for the software project, and, based on a stored timing requirement and the release version requirement, identifying and retrieving the stored parameters for the testing process. The stored parameters may comprise one or more of:
 1. a software release version;
 2. a data model having at least one attribute;
 3. at least one attribute identifier that identifies an attribute of the data model to be impacted by the software project;
 4. a data table identifier that identifies a data table; and
 5. a plurality of test category statuses, each corresponding to a respective test category.

In some embodiments, receiving software project source code and/or identifying parameters for testing the source code may be executed automatically (e.g., in accordance with a migration schedule and/or in response to a trigger event, such as the check-in of changed source code to a data repository).

The method 300 may further comprise automatically defining multiple test cases for testing the software package, at 306, and automatically executing the multiple test cases, at 308. In one embodiment, automatically defining multiple test cases may comprise creating test case definitions, including test SQL definitions for testing purposes, as discussed above with respect to FIG. 2 and to the example scenarios.

In some embodiments, automatically defining a test case may comprise updating an existing smoke test case definition. For example, after creating a new test case, the software testing process may comprise determining if a corresponding test case already exists, and if one does, updating that existing smoke test case definition. Alternatively, in some embodiments, automatically defining a test case comprises creating a new smoke test case definition.

As discussed in this disclosure, an automatically-defined test case may comprise any of various types of test cases, including, without limitation, a primary key check test, a change data capture test, a duplicate data test, and a data table completeness test.

Further, some embodiments may comprise uploading a test case to a test plan section of a software quality management system (e.g., Quality Center), and mapping the test case to a stored requirement of the testing process in the software quality management system. One or more test sets may be created that comprise any automatically-defined test cases.

According to some embodiments, automatically defining a test case (and/or identifying parameters for testing) may comprise determining, based on the identified parameters, one or more data table identifiers identifying data tables impacted by the software project, a data model impacted by the software project, and/or one or more attributes of the data model impacted by the software project. In one example, as noted above, identified parameters for testing the source code may include one or more of the above types of information, which may then be used by the method for automatically defining test cases that meet the stored requirements.

Defining test cases may comprise, in some embodiments, defining and storing at least one respective test case for each test category required for the testing process. For example, the identified parameters may indicate one or more test category statuses, each corresponding to a respective test category. If a test category status indicates that the corresponding test category is required for the test process, the method may automatically define the required test case for that test category.

According to some embodiments, each test case definition may comprise one or more of the following:
 1. a test case identifier that identifies the respective test case;
 2. a data table identifier (e.g., associated with a testing requirement);
 3. an indication of a test category corresponding to the test case; and
 4. a test case expected result for the test case.

According to some embodiments, automatically defining a test case (and/or identifying parameters for testing) may comprise retrieving a predetermined SQL format for the test case. In one example, the predetermined SQL format may be associated with a particular test category, and the method may comprise determining and retrieving the SQL format associated with the test case category for which a test case is being defined (e.g., by looking up the format in a requirements database associated with the software project).

In one example, automatically defining a test case may comprise generating a test case SQL definition for the automatically-defined test case based on the predetermined SQL format associated with test case category, an associated data table identifier, and at least one attribute identifier identifying an attribute to be impacted by the software project.

In some embodiments, executing a test case may comprise executing a test case SQL definition to determine a test case SQL result of the test case SQL definition for the automatically-defined test case. In some embodiments, the test case SQL result is compared to the test case expected result that is associated with the automatically-defined test case, to determine a test case status for the automatically-defined test case (e.g., a pass or fail status for that specific test case). The method may further comprise determining on one or more individual test case statuses, an execution status for the testing process (e.g., an overall status for a software project based on executing all the associated, automatically-defined test cases).

Defining the multiple test cases may comprise first determining whether the source code is eligible for automated testing (e.g., by determining whether the software project was predetermined to be eligible, such as by looking up a stored database record associated with the software project to determine the testing status).

In some embodiments, a report may be generated following the automatic execution of the multiple test cases (e.g., indicating an individual test case status and/or an overall execution status for the software project), and a professional may be assigned and/or notified to resolve any issues identified. In one example, transmitting to a user an indication of an execution status may comprise one or more of creating a message including the indication of the execution status, determining at least one developer associated with the testing process (e.g., by retrieving the information from the software project database), and transmitting the message to the at least one developer.

According to some embodiments, a software development process may further comprise transmitting a software project to a production environment (e.g., after successfully completing a software testing process).

Figure 4:
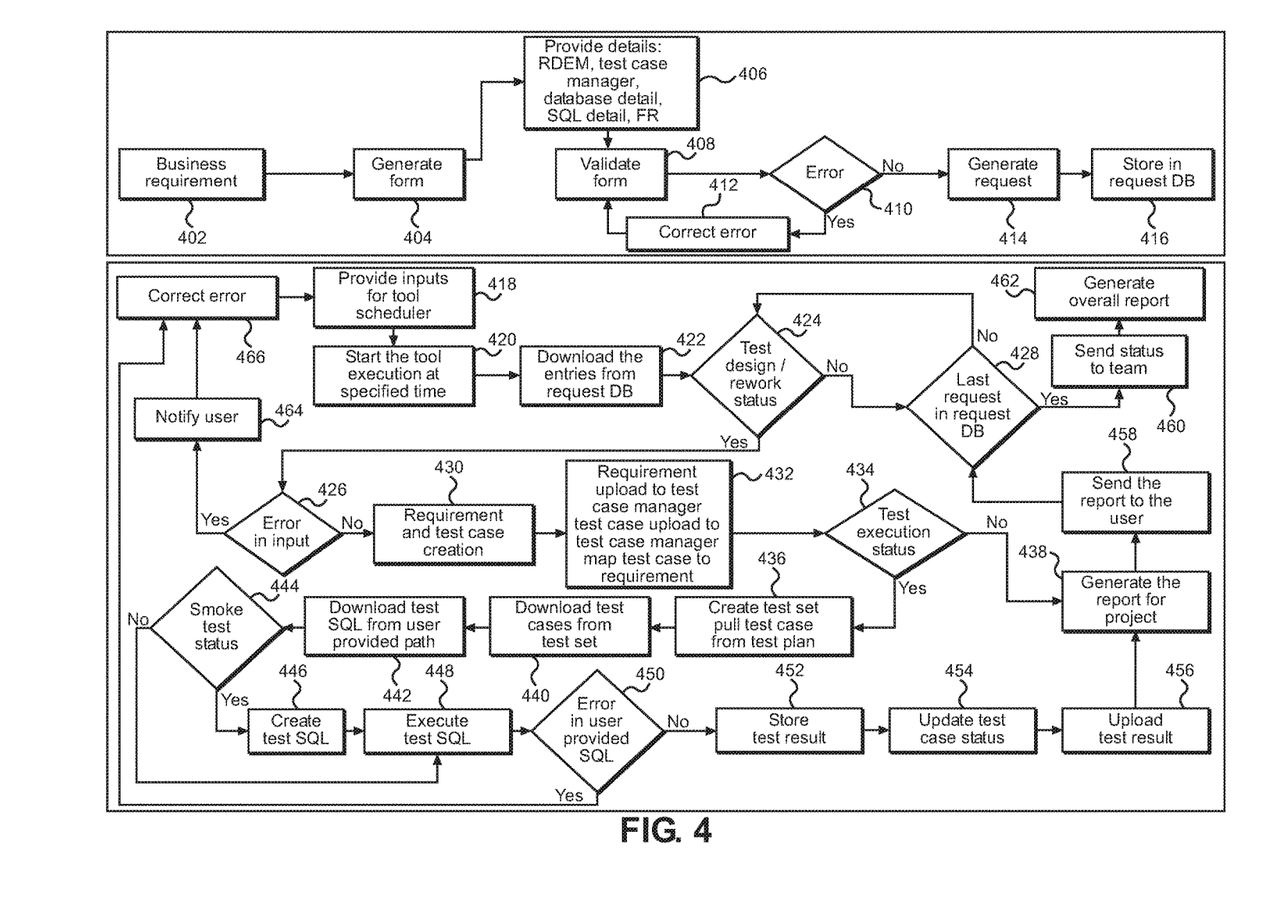
FIG. 4 is a flowchart of a method according to one or more embodiments.

Referring now to FIG. 4, a flow diagram of a method 400 according to some embodiments is shown. The method 400 may be performed, for example, by a software testing controller device (e.g., a software testing server of a software development system).

According to some embodiments, the method 400 may comprise a setup phase for testing a software project that includes receiving business requirements for a software project, at 402, generating a form for receiving details associated with the software project, at 404, and receiving (e.g., via the form) the detailed information associated with the software project, at 406.

The method 400 may further comprise validating the received information, at 408. If an error in the information is identified, at 410, the method 400 may comprise correcting the error, at 412, and validating again, at 408. If the information is validated successfully, at 410, then the method 400 may further comprise generating a request to execute a software testing process, at 414, and, storing one or more entries associated with the request in a request database (e.g., a software project database storing information for testing requests for one or more software projects), at 416.

According to some embodiments, the method 400 may further comprise a test execution phase for testing a software project that includes determining scheduling information for use in triggering the software testing process, at 418, and starting the test execution at the scheduled time, at 420. The method 400 may further comprise downloading request entries related to the software project to be tested from a request database, at 422, and determining, based on a stored status indicator associated with a request, whether the software project is to be tested, at 424. If not, the method 400 may further comprise determining whether that request is the last request for the software project in the request database, at 428, and if so, sending a status of the test execution phase to one or more team members associated with the software project, at 460, and generating an overall report for the test execution phase, at 462. If, at 428, it is determined that there is another request in the request database, then the method 400 may return to check the status indicator associated with the next request.

If, at 424, a request is to be processed for software testing based on the status indicator, the method 400 may further comprise determining whether there were any errors in the stored request, at 426, and, if so, notifying a user associated with the request, at 464, and correcting the error, at 466. If, at 426, there are no errors in the stored request, the method 400 may further comprise defining requirements and creating test cases (e.g., based on the information stored in the request database), at 430, uploading the requirements and test cases to a test case manager and mapping test cases to requirements, at 432. The method 400 may further comprise checking a text execution status, at 434, and if the status indicates testing is to be executed, then creating a test set (e.g., in a test case manager), at 436, downloading test cases from the test set, at 440, and downloading predefined SQL formats for testing (e.g., from a user-provided logical address), at 442. If smoke test status indicates that at least one smoke test is to be performed, at 444, then the method 400 may further comprise automatically creating test case SQL definitions, at 446, and automatically executing the test case SQL definitions, at 448. As discussed in this disclosure with respect to some embodiments, smoke test cases may be created automatically by downloading a data model, retrieving an indication of at least one impacted data table, and creating test case SQL definitions based on the at least one impacted data table and at least one predefined SQL format.

If, at 450, an error is identified in the user-provided SQL, then the method may proceed to correct the error, at 466. Otherwise, the test case results are stored (e.g., in a software project database), at 452, the test case status may be updated (e.g., to indicate pass/fail status of the test case), at 454, the test result may be uploaded (e.g., to a central software testing system), at 456, to generate a report for the software project, at 438. The report may be sent (e.g., by email) to at least one user associated with the software project, at 458.

According to some embodiments, a software testing system may further provide for testing one or more types of data moves, such as, but not limited to, straight data moves and derived data moves (and other types of more complex data moves). Test cases for straight data moves, for example, may test the transfer of data elements from a first source database to a second target database, while retaining the original data value. Test cases for a derived data move, on the other hand, may involve accessing source data elements in two or more source databases, and may result in a new data value being stored in a target database. Derived data moves may involve accessing data values from multiple source databases and applying a formula, transformation, or other determination to the multiple data sources to derive the data value that will be stored in the target database. For instance, data values from original sources may have a mathematical formula applied to them to derive a new data value, or an algorithm may determine which one of multiple original data values will be copied to the new target database.

According to some embodiments, a computer processing apparatus may execute, process, facilitate, and/or otherwise be associated with one or more methods (e.g., software testing processes involving automated creating of test cases) described in this disclosure. The apparatus may be suitable, for example, for providing functionality of any of the software environment server 106, software testing controller 170, and/or software testing controller device 206, and/or may otherwise comprise a portion of the systems 100 and 200 described in this disclosure.

In some embodiments, the apparatus may comprise at least one processing device, input device, output device, communication device, and/or memory device. Fewer or more components and/or various configurations of the components may be included in the apparatus without deviating from the scope of embodiments described in this disclosure.

According to some embodiments, the processing device may be or include any type, quantity, and/or configuration of electronic and/or computerized processor that is or becomes known. The processing device may comprise, for example, an Intel® IXP 2800 network processor or an Intel® XEON™ Processor coupled with an Intel® E7501 chipset. In some embodiments, the processing device may comprise multiple inter-connected processors, microprocessors, and/or micro-engines. According to some embodiments, the processing device (and/or the apparatus and/or portions thereof) may be supplied power via a power supply (not shown) such as a battery, an alternating current (AC) source, a direct current (DC) source, an AC/DC adapter, solar cells, and/or an inertial generator. In the case that the apparatus comprises a server such as a blade server, necessary power may be supplied via a standard AC outlet, power strip, surge protector, and/or uninterruptible power supply (UPS) device.

In some embodiments, the input device and/or the output device are communicatively coupled to the processing device (e.g., via wired and/or wireless connections and/or pathways) and they may comprise any types or configurations of input and output components and/or devices that are or become known, respectively. The input device may comprise, for example, a keyboard that allows an operator of the apparatus to interface with the apparatus (e.g., by a developer, such as to initiate a software testing process). The output device may, according to some embodiments, comprise a display screen and/or other practicable output component and/or device. The output device may, for example, provide a software testing interface to a developer (e.g., for inputting software project data). According to some embodiments, the input device and/or the output device may comprise and/or be embodied in a single device such as a touch-screen monitor.

In some embodiments, the communication device may comprise any type or configuration of communication device that is or becomes known or practicable. The communication device may, for example, comprise a network interface card (NIC), a telephonic device, a cellular network device, a router, a hub, a modem, and/or a communications port or cable. In some embodiments, the communication device may be coupled to provide data to a developer device and/or a user device, such as in the case that the apparatus is configured to provide a software testing process with automated test case definition as described this disclosure. In some embodiments, the communication device may comprise an IR, RF, Bluetooth™, and/or Wi-Fi® network device coupled to facilitate communications between the processing device and another device (such as a developer device and/or a user device).

According to the example embodiment for an apparatus, the memory device may comprise any appropriate information storage device that is or becomes known or available, including, but not limited to, units and/or combinations of magnetic storage devices (e.g., a hard disk drive), optical storage devices, and/or semiconductor memory devices such as RAM devices, read only memory (ROM) devices, single data rate random access memory (SDR-RAM), double data rate random access memory (DDR-RAM), and/or programmable read only memory (PROM).

The memory device may, according to some embodiments, store one or more of software testing application instructions and/or automated test case generation instructions. In some embodiments, software instructions and/or software testing data stored in the memory device may be utilized by the processing device to provide output information via the output device and/or the communication device.

Any or all of the specialized instructions and data types described this disclosure and other practicable types of data may be stored in any number, type, and/or configuration of memory devices that is or becomes known. The memory device may, for example, comprise one or more data tables or files, databases, table spaces, registers, and/or other storage structures. In some embodiments, multiple databases and/or storage structures (and/or multiple memory devices) may be utilized to store information associated with the apparatus. According to some embodiments, the memory device may be incorporated into and/or otherwise coupled to the apparatus (e.g., as shown) or may simply be accessible to the apparatus (e.g., externally located and/or situated).

One or more of various types of data storage devices may be used in accordance with one or more embodiments discussed in this disclosure. A data storage device may, for example, be utilized to store instructions and/or data, such as the instructions and/or data described in reference to one or more of the example computing devices in this disclosure. One or more types and/or combinations of data storage devices may store program instructions, software, and/or modules that, when executed by a processing device, cause a particular machine to function in accordance with one or more embodiments described in this disclosure. In some embodiments, instructions stored on a data storage device may, when executed by a processor (such as a processor device described in this disclosure with respect to one or more computing devices), cause the implementation of and/or facilitate the any of the methods, and/or portions or combinations of such methods, described in this disclosure. The following descriptions of some example types of data storage devices are representative of a class and/or subset of computer-readable media that are defined in this disclosure as "computer-readable memory" (e.g., non-transitory memory devices, as opposed to transmission devices or media).

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the data storage device and/or the data storage medium may be configured to store information utilizing one or more magnetic, inductive, and/or optical means (e.g., magnetic, inductive, and/or optical-encoding). The data storage medium may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes known or practicable. In some embodiments, a data storage device may comprise a USB key fob, dongle, and/or other type of flash memory data storage device that is or becomes known or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols. For a more exhaustive list of protocols, the term "network" is defined in this disclosure and includes many exemplary protocols that are also applicable in this disclosure.

In some embodiments, one or more specialized machines such as a computerized processing device, a server, a remote terminal, and/or a user device may implement the various practices described in this disclosure.

Numerous embodiments are described in this disclosure and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The terms "an embodiment," "embodiment," "embodiments," "the embodiment," "the embodiments," "one or more embodiments," "some embodiments," "one embodiment" and the like mean "one or more (but not all) disclosed embodiments," unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "in this disclosure" means "in the present disclosure, including anything which may be incorporated by reference," unless expressly specified otherwise.

The phrase "at least one of," when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car, and a wheel.

The phrase "based on" does not mean "based only on," unless expressly specified otherwise. In other words, the phrase "based on" describes both "based only on" and "based at least on."

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second"

before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used in this disclosure is an area that conveys information to a viewer. The information may be dynamic, in which case, an LCD, LED, organic LED (OLED), CRT, digital light processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p, 4 k, or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch-screen features or associated keypads as is well understood.

The present disclosure may refer to a "control system." A control system, as that term is used in this disclosure, may be a computer processor coupled with an operating system, device drivers, and appropriate programs (collectively "software") with instructions to provide the functionality described for the control system. The software is stored in an associated memory device (sometimes referred to as a computer readable medium).

A "processor" means any one or more microprocessors, central processing unit (CPU) devices, computing devices, microcontrollers, digital signal processors, or like devices.

As used in this disclosure, the term "network component" may refer to a user or network device, or a component, piece, portion, or combination of user or network devices. Examples of network components may include a static random-access memory (SRAM) device or module, a network processor, and a network communication path, connection, port, or cable.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards, or protocols. For a more exhaustive list of protocols, the term "network" is defined below and includes many exemplary protocols that are also applicable here.

It will be readily apparent that the various methods and algorithms described in this disclosure may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models, hierarchical electronic file structures, and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used in this disclosure, the term "network component" may refer to a user or network device, or a component, piece, portion, or combination of user or network devices. Examples of network components may include a static random-access memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication." As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a software, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

In addition, some embodiments are associated with a "network" or a "communication network." As used in this disclosure, the terms "network" and "communication network" may be used interchangeably and may refer to an environment w in this disclosure one or more computing devices may communicate with one another, and/or to any object, entity, component, device, and/or any combination thereof that permits, facilitates, and/or otherwise contributes to or is associated with the transmission of messages, packets, signals, and/or other forms of information between and/or within one or more network devices. Such devices may communicate directly or indirectly, via a wired or wireless medium such as the Internet, LAN, WAN or Ethernet (or IEEE 802.3), Token Ring, or via any appropriate communications means or combination of communications means. In some embodiments, a network may include one or more wired and/or wireless networks operated in accordance with any communication standard or protocol that is or becomes known or practicable. Exemplary protocols include but are not limited to: Bluetooth™, Time Division Multiple Access (TDMA), Software Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), the Fast Ethernet LAN transmission standard 802.3-

2002® published by the Institute of Electrical and Electronics Engineers (IEEE), or the like. Networks may be or include a plurality of interconnected network devices. In some embodiments, networks may be hard-wired, wireless, virtual, neural, and/or any other configuration of type that is or becomes known. Note that if video signals or large files are being sent over the network, a broadband network may be used to alleviate delays associated with the transfer of such large files, however, such is not required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

It will be readily apparent that the various methods and algorithms described in this disclosure may be implemented by, e.g., specially programmed computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input, and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. A controller device for testing software, comprising:
a processor; and
a computer-readable medium storing instructions that when executed by the processor direct the processor to:
retrieve a stored timing requirement for executing a testing process for a software project;
retrieve a stored release version requirement for executing the testing process for the software project;
based on the timing requirement and the release version requirement, identify and retrieve stored parameters for the testing process for the software project, the stored parameters comprising:
a software release version,
a data model having at least one attribute,
at least one attribute identifier that identifies an attribute of the data model to be impacted by the software project,
a data table identifier that identifiers a data table, and
a plurality of test category statuses, each corresponding to a respective test category;
for each test category status of the plurality of test category statuses that indicates a corresponding test category is required for the testing process, automatically define and store at least one respective test case for the corresponding test category, wherein each test case comprises:
a test case identifier that identifies the respective test case,
the data table identifier,
an indication of the corresponding test category, and
a test case expected result for the test case;
retrieve a first predetermined structured query language (SQL) format for a first automatically-defined test case, based on the test category associated with the first automatically-defined test case;
generate a first test case SQL definition for the first automatically-defined test case based on the first predetermined SQL format, the data table identifier, and the at least one attribute identifier;
execute the first test case SQL definition to determine a first test case SQL result of the first test case SQL definition for the first automatically-defined test case;
compare the first test case SQL result to the test case expected result that is associated with the first automatically-defined test case, to determine a first test case status for the first automatically-defined test case;
based on at least the first test case status, determine an execution status for the testing process; and
transmit to at least one user an indication of the execution status for the testing process.

2. The controller device of claim 1, wherein automatically defining the first automatically-defined test case comprises updating an existing smoke test case definition.

3. The controller device of claim 1, wherein automatically defining the first automatically-defined test case comprises creating a new smoke test case definition.

4. The controller device of claim 1, wherein the first automatically-defined test case defines a primary key check test.

5. The controller device of claim 1, wherein the first automatically-defined test case defines a change data capture test.

6. The controller device of claim 1, wherein the first automatically-defined test case defines a duplicate data test.

7. The controller device of claim 1, wherein the first automatically-defined test case defines a data table completeness test.

8. The controller device of claim 1,
wherein the processor is in communication with a software quality management system, and
wherein the instructions when executed by the processor further direct the processor to:
upload the first automatically-defined test case to a test plan section of the software quality management system.

9. The controller device of claim 8, wherein the instructions when executed by the processor further direct the processor to:

map, in the software quality management system, the first automatically-defined test case to a stored requirement of the testing process.

10. The controller device of claim 1, wherein the instructions when executed by the processor further direct the processor to:
create, in the software quality management system, a test set comprising the at least one respective test case.

11. The controller device of claim 1, wherein automatically transmitting to the at least one user the indication of the execution status comprises:
creating a message including the indication of the execution status;
determining at least one developer associated with the testing process; and
transmitting the message to the at least one developer.

12. The controller device of claim 1, wherein the instructions when executed by the processor further direct the processor to:
transmit the software project to a production environment.

13. A method comprising:
retrieving, by a controller device in communication with a software quality management system, a stored timing requirement for executing a testing process for a software project;
retrieving a stored release version requirement for executing the testing process for the software project;
based on the timing requirement and the release version requirement, identifying and retrieving stored parameters for the testing process for the software project, the stored parameters comprising:
a software release version,
a data model having at least one attribute,
at least one attribute identifier that identifies an attribute of the data model to be impacted by the software project,
a data table identifier that identifiers a data table, and
a plurality of test category statuses, each corresponding to a respective test category;
for each test category status of the plurality of test category statuses that indicates a corresponding test category is required for the testing process, automatically defining and storing at least one respective test case for the corresponding test category, wherein each test case comprises:
a test case identifier that identifies the respective test case,
the data table identifier,
an indication of the corresponding test category, and
a test case expected result for the test case;
retrieving a first predetermined structured query language (SQL) format for a first automatically-defined test case, based on the test category associated with the first automatically-defined test case;
generating a first test case SQL definition for the first automatically-defined test case based on the first predetermined SQL format, the data table identifier, and the at least one attribute identifier;
executing the first test case SQL definition to determine a first test case SQL result of the first test case SQL definition for the first automatically-defined test case;
comparing the first test case SQL result to the test case expected result that is associated with the first automatically-defined test case, to determine a first test case status for the first automatically-defined test case;
based on at least the first test case status, determining an execution status for the testing process; and
transmitting to at least one user an indication of the execution status for the testing process.

14. The method of claim 13, wherein automatically defining the first automatically-defined test case comprises updating an existing smoke test case definition.

15. The method of claim 13, wherein automatically defining the first automatically-defined test case comprises creating a new smoke test case definition.

16. The method of claim 13, wherein the first automatically-defined test case defines one of the following types of tests:
a primary key check test,
a change data capture test,
a duplicate data test,
a data table completeness test,
a straight data move test, and
a derived data move test.

17. The method of claim 13, further comprising:
uploading the first automatically-defined test case to a test plan section of the software quality management system.

18. The method of claim 17, further comprising:
mapping, in the software quality management system, the first automatically-defined test case to a stored requirement of the testing process.

19. The method of claim 18, further comprising:
creating, in the software quality management system, a test set comprising the at least one test case.

20. The method of claim 13, wherein automatically transmitting to the at least one user the indication of the execution status comprises:
creating a message including the indication of the execution status;
determining at least one developer associated with the testing process; and
transmitting the message to the at least one developer.

21. The method of claim 13, further comprising:
transmitting the software project to a production environment.

* * * * *